(12) United States Patent
Williams et al.

(10) Patent No.: US 12,063,232 B2
(45) Date of Patent: Aug. 13, 2024

(54) HYBRID CUSTOMER PREMISES EQUIPMENT AND CLOUD-BASED IMPLEMENTATION OF DYNAMIC RESIDENTIAL THREAT DETECTION

(71) Applicant: CYBER ADAPT, INC., Dallas, TX (US)

(72) Inventors: Simon Williams, San Jose, CA (US); Michael Weinberger, Dallas, TX (US); Samuel Stover, Gettysburg, PA (US); David Kramer, Bethesda, MD (US)

(73) Assignee: CYBER ADAPT, INC., Dallas, TX (US)

( * ) Notice: Subject to any disclaimer, the term of this patent is extended or adjusted under 35 U.S.C. 154(b) by 213 days.

(21) Appl. No.: 17/842,441

(22) Filed: Jun. 16, 2022

(65) Prior Publication Data
US 2023/0412617 A1 Dec. 21, 2023

(51) Int. Cl.
*H04L 29/06* (2006.01)
*H04L 9/40* (2022.01)

(52) U.S. Cl.
CPC ...... *H04L 63/1416* (2013.01); *H04L 63/0236* (2013.01); *H04L 63/0876* (2013.01); *H04L 63/1425* (2013.01); *H04L 63/1466* (2013.01)

(58) Field of Classification Search
CPC ............. H04L 63/1416; H04L 63/0236; H04L 63/0876; H04L 63/1425; H04L 63/1466
See application file for complete search history.

(56) References Cited

U.S. PATENT DOCUMENTS

| | | | |
|---|---|---|---|
| 9,906,557 B2* | 2/2018 | Hsiung | ............... H04L 41/0893 |
| 11,570,201 B2* | 1/2023 | Mallis | ................. H04L 63/0236 |
| 2017/0180395 A1* | 6/2017 | Stransky-Heilkron | ..................... H04W 12/12 |
| 2017/0295191 A1* | 10/2017 | Choi | ................... H04L 67/1014 |

(Continued)

OTHER PUBLICATIONS

Williams, Simon, et al., "Customer Premises Equipment Implementation of Dynamic Residential Threat Detection," filed Nov. 30, 2021, U.S. Appl. No. 17/538,652.

(Continued)

*Primary Examiner* — Brandon Hoffman
*Assistant Examiner* — William A Corum, Jr.
(74) *Attorney, Agent, or Firm* — Conley Rose, P.C.; Michael W. Piper; Elexis A. Jones

(57) ABSTRACT

A dynamic hybrid residential threat detection method is disclosed. The method includes receiving, by a packet selector on a customer premises equipment (CPE), communication sessions and selecting and sending, by the packet selector, a predefined number of packets of the communication sessions to a CPE detection engine based on packet selection rules. The method also includes inspecting, by the CPE detection engine, the predefined number of packets of each communication session based on CPE detection rules that establish what type of inspection is to be performed by the CPE detection engine based at least in part on CPE resource constraints. The method further includes sending, by the packet selector, the predefined number of packets of at least some of the communication sessions to a cloud detection engine and blocking particular communication traffic on the CPE based on the inspection and/or an instruction from the cloud detection engine.

18 Claims, 5 Drawing Sheets

(56) References Cited

U.S. PATENT DOCUMENTS

2021/0184983 A1\* 6/2021 Ramaswamy .......... H04L 47/36
2022/0353240 A1\* 11/2022 McDowall .............. H04L 63/02

OTHER PUBLICATIONS

Williams, Simon, et al., "Cloud-Based Implementation of Dynamic Threat Detection," filed Dec. 28, 2021, U.S. Appl. No. 17/564,192.
Notice of Allowance dated Mar. 14, 2024, U.S. Appl. No. 17/538,652, filed Nov. 30, 2021.
Notice of Allowance dated Apr. 1, 2024, U.S. Appl. No. 17/564,192, filed Dec. 28, 2021.

\* cited by examiner

HYBRID CUSTOMER PREMISES EQUIPMENT AND CLOUD-BASED IMPLEMENTATION OF DYNAMIC RESIDENTIAL THREAT DETECTION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Home network usage is changing. For example, more devices are operating on the home network and more people are working from home. In addition to the change in home network usage, there has been an overall increase in cyber security threats targeting home networks and a large number of these networks lack basic cyber security measures. As a result, home networks are more vulnerable to cyber-attacks.

SUMMARY

In an embodiment, a dynamic hybrid residential threat detection system is disclosed. The system comprises a customer premises equipment (CPE) comprising a non-transitory memory, a processor, and a packet selector stored in the non-transitory memory of the CPE, that when executed by the processor of the CPE, receives a plurality of communication sessions and selects and sends a predefined number of packets of each of the plurality of communication sessions to a CPE detection engine on the CPE based on packet selection rules. The CPE also comprises the CPE detection engine stored in the non-transitory memory of the CPE, that when executed by the processor of the CPE, inspects the predefined number of packets of each of the plurality of communication sessions based on CPE detection rules. The CPE detection rules establish what type of inspection is to be performed by the CPE detection engine based at least in part on resource constraints of the CPE. The packet selector, in response to the inspection, sends the predefined number of packets of at least some of the plurality of communication sessions to a cloud detection engine. The system further comprises a computer system comprising a non-transitory memory, a processor, and a dynamic detection rule optimizer stored in the non-transitory memory of the computer system that, when executed by the processor of the computer system, selects and sends the CPE detection rules to the CPE detection engine. The CPE detection rules are a subset of cloud detection rules. The computer system also comprises the cloud detection engine stored in the non-transitory memory of the computer system that, when executed by the processor of the computer system, receives and inspects the predefined number of packets of each of the at least some of the plurality of communication sessions based on the cloud detection rules. Particular communication traffic is blocked based on at least one of the inspection performed by the CPE detection engine or the inspection performed by the cloud detection engine.

In another embodiment, a dynamic hybrid residential threat detection method is disclosed. The method comprises receiving, by a packet selector stored in non-transitory memory of a customer premises equipment (CPE) and executable by a processor of the CPE, a first plurality of communication sessions and selecting and sending, by the packet selector, a predefined number of packets of each of the first plurality of communication sessions to a CPE detection engine on the CPE based on default packet selection rules. The method also comprises performing, by the CPE detection engine, a first level of inspection on the predefined number of packets of each of the first plurality of communication sessions based on CPE detection rules and sending, by the packet selector, the predefined number of packets of at least some of the first plurality of communication sessions to a cloud detection engine on a computer system. The method additionally comprises receiving, by the CPE detection engine, updated CPE detection rules from a dynamic detection rule optimizer on the computer system. The method further comprises receiving, by the packet selector, a second plurality of communication sessions and selecting and sending, by the packet selector, the predefined number of packets of each of the second plurality of communication sessions to the CPE detection engine based on the default packet selection rules. The method also comprises performing, by the CPE detection engine, a second level of inspection on the predefined number of packets of each of the second plurality of communication sessions based on the updated CPE detection rules and sending, by the packet selector, the predefined number of packets of at least some of the second plurality of communication sessions to the cloud detection engine. The method further comprises blocking particular communication traffic based on at least one of the first level of inspection performed by the CPE detection engine, the second level of inspection performed by the CPE detection engine, or an instruction sent by the cloud detection engine responsive to the cloud detection engine inspecting the predefined number of packets of at least some of the first plurality of communication sessions or the predefined number of packets of at least some of the second plurality of communication sessions.

In yet another embodiment, a dynamic hybrid residential threat detection method is disclosed. The method comprises receiving, by a packet selector stored in non-transitory memory of a customer premises equipment (CPE) and executable by a processor of the CPE, a plurality of communication sessions and selecting and sending, by the packet selector, a predefined number of packets of the plurality of communication sessions to a CPE detection engine on the CPE based on packet selection rules. The method also comprises inspecting, by the CPE detection engine, the predefined number of packets of each of the plurality of communication sessions based on CPE detection rules. The CPE detection rules establish what type of inspection is to be performed by the CPE detection engine based at least in part on resource constraints of the CPE. The method further comprises sending, by the packet selector, the predefined number of packets of at least some of the plurality of communication sessions to a cloud detection engine on a computer system and blocking particular communication traffic on the CPE based on at least one of the inspection performed by the CPE detection engine or an instruction sent by the cloud detection engine responsive to the cloud detection engine inspecting the predefined number of packets of at least some of the plurality of communication sessions.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
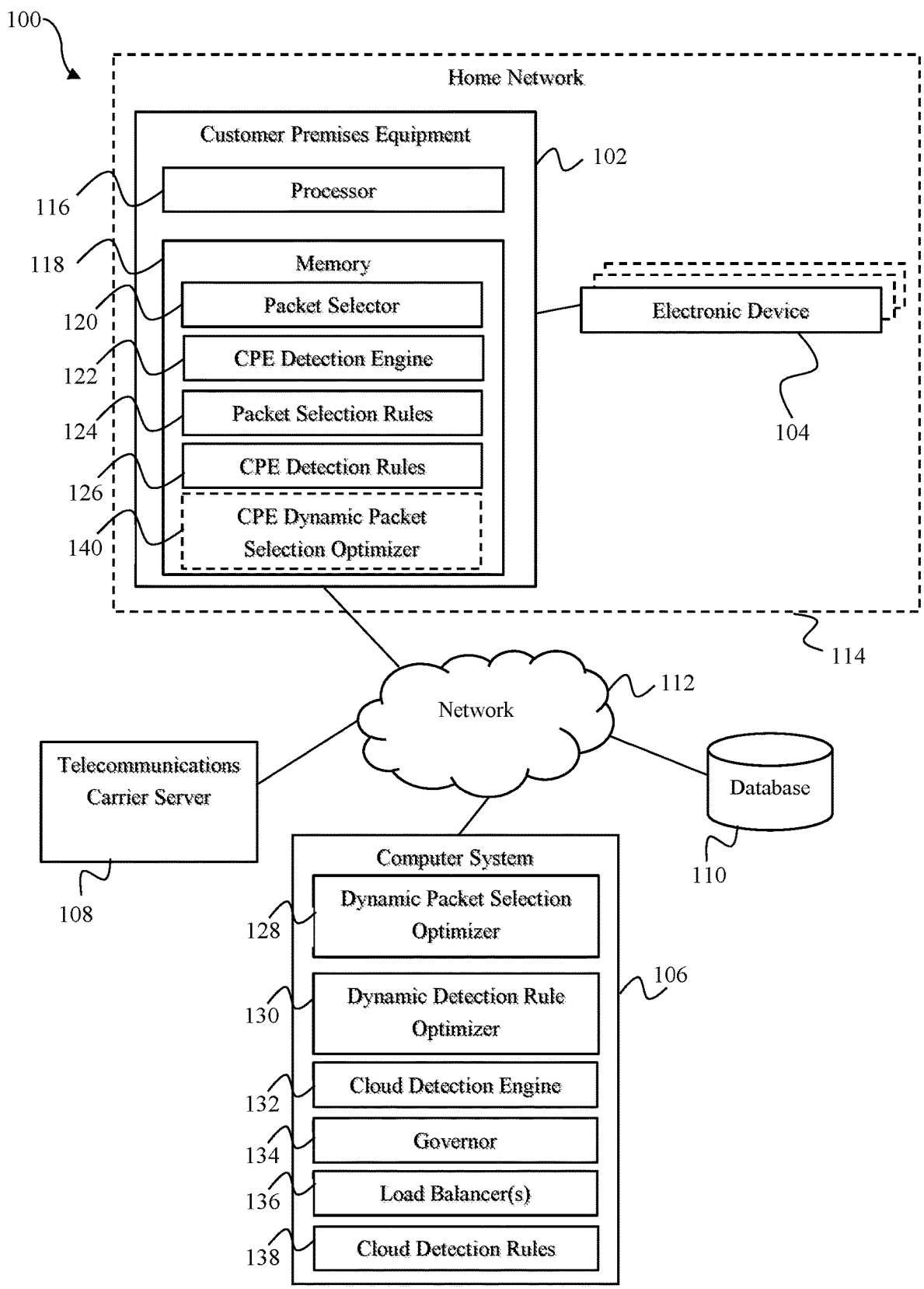
FIG. 1 is a block diagram of a dynamic hybrid threat detection system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Because of the growing number of devices in home networks, and the increased, differentiated use of such networks, as well as an increase in cyber security threats and a lack of basic cyber security measures in such networks, home networks may be more vulnerable to cyber-attacks. Existing residential threat detection solutions focus on a reputation based detection of domains and IP addresses that are blacklisted. However, this type of reputation based detection is not all that effective as it is difficult to maintain an up-to-date blacklist since the perpetrators are constantly changing domains/IP addresses. Further, mere reputation based detection misses key exploits and malicious incoming and outgoing communications especially from new or changing players or sources.

To overcome the shortcomings in existing threat detection solutions, the pending application is directed to using packet inspection to analyze the actual payload of incoming traffic to, outgoing traffic from, or traffic within a home network. Packet inspection may include header inspection, DNS packet inspection, TLS handshake inspection, payload inspection, or another type of packet inspection. Use of packet inspection allows unique indicators of a cyber-attack to be identified that are difficult for the perpetrator to change. For example, packet inspection can be used to identify threats based on indicators of malware covering file types, protocol analysis, data movement/storage, URIs, PKIs, and/or other payload attributes independent of IP address/domain. However, traditional deep packet inspection requires extensive resources and impacts overall network performance, which is why packet inspection is typically only practiced in robust enterprise environments that have the necessary resources and can support economic implications.

The pending application navigates the bandwidth, processing, and memory challenges associated with home networks such that packet inspection can be performed for a residential environment. In particular, the pending application leverages the benefits of packet inspection while managing the challenges of the residential environment primarily through a combination of creatively architected solutions for ease of installation and/or use by the consumer (and efficiency of the telecommunications carrier) with an optimized approach to packet inspection reducing the total resources required while providing most of the key benefits improving on existing solutions.

The specifically architected threat detection solution discussed herein is a hybrid solution. In the hybrid solution, some detection is performed on the customer premises equipment (CPE) itself and some detection is performed in the cloud. In particular, the CPE comprises a CPE detection engine which applies CPE detection rules to a predefined number of packets of communication sessions. Further, a computer system comprises a cloud detection engine that applies cloud detection rules to the predefined number of packets of at least some of the communication sessions. The cloud detection rules may comprise a full set of detection rules that reside in the cloud. The CPE detection rules may comprise a subset of the cloud detection rules.

The pending application navigates resource constraints of the CPE by dynamically changing, based on various factors discussed below, how many predefined packets of each communication session are inspected by the CPE detection engine and/or the cloud detection engine, and what level of inspection is performed by the CPE detection engine via which CPE detection rules are applied. Further, in some embodiments, the pending application may navigate resource constraints of the CPE by dynamically changing, based on the various factors discussed below, which predefined packets of a communication session are sent to the CPE detection engine versus which predefined packets of a communication session are sent to the cloud detection engine. In some embodiments, a predefined number of packets of a communication session may be sent to both the CPE detection engine and the cloud detection engine. For example, a predefined number of packets of a communication session may be initially sent to the CPE detection engine and then sent to the cloud detection engine for further inspection.

To manage the resource challenges associated with home networks, but still provide the benefits of packet inspection, the pending application uses a dynamically optimized type of packet inspection where a predetermined number of packets for each communication session are used for packet inspection. A packet selector on the CPE applies packet selection rules to a plurality of communication sessions. For each communication session, the packet selection rules may define a predefined number of packets to be selected. In some embodiments, the packet selection rules may also define whether such predefined number of packets are to be sent to the CPE detection engine and/or the cloud detection engine.

The packet selector may apply different packet selection rules specifying different predefined numbers of packets depending on various characteristics of a given communication session (e.g., type of protocol used, an internal endpoint, an external endpoint, etc.). The predetermined number of packets may be a subset of the total amount of packets in a communication session, such as the first 10 packets or some other number of packets. The predetermined number of packets may dynamically change over time based on monitoring various internal and/or external factors such as CPE load characteristics, internal threat information, external threat information, asset characteristics, or traffic protocol types. The predetermined number of packets may vary depending on the type of protocol used in the communication session (e.g., encrypted protocol type, an unencrypted protocol type, a stateful session protocol type, a stateless session protocol type, etc.). The predetermined number of packets may vary depending on an internal endpoint or an external endpoint of the communication session. The predetermined number of packets may vary depending on internal threat information, external threat information, network utilization, traffic volume, time of day, geographic location, or any other relevant factors. In order to avoid disruption of the traffic, the packet selector may apply the packet selection rules to duplicate packets instead of the original packets from the communication session.

The predetermined number of packets of each communication session may be sent by the packet selector to the CPE detection engine for inspection. Based on that inspection, the predefined number of packets for at least some of the communication sessions may be sent to the cloud detection engine. For example, the predefined number of packets of any of the communication sessions that do not raise a threat indication based on the inspection performed by the CPE detection engine may be sent to the cloud detection engine for further inspection. In some cases, even the predetermined number of packets of communication sessions that raise a threat indication based on the inspection performed by the CPE detection engine may be sent to the cloud detection engine.

While discussed above as having the predetermined number of packets for all communication sessions sent to the CPE detection engine initially and then having at least some of those sent on to the cloud detection engine, in some embodiments, the packet selection rules may specify which communication sessions' predefined number of packets are to be sent to the CPE detection engine versus which communication sessions' predefined number of packets are sent to the cloud detection engine. Stated differently, in some embodiments, there may be certain communication sessions' predefined number of packets that bypass the CPE detection engine and go straight to the cloud detection engine based on the packet selection rules applied by the packet selector. In such embodiments, which communication sessions' predefined number of packets are to be sent to the CPE detection engine versus which communication sessions' predefined number of packets are sent to the cloud detection engine may dynamically change over time based on monitoring various internal and/or external factors such as CPE load characteristics, internal threat information, external threat information, asset characteristics, traffic protocol types, or other factors. More communication sessions' predefined numbers of packets may be sent to the CPE detection engine when there are less resource constraints (e.g., memory and/or processing constraints) on the CPE. For instance, during certain days of the week or certain hours of a day, there may be less resource constraints on the CPE, and therefore more communication sessions' predefined numbers of packets may be sent to the CPE detection engine for inspection.

The predefined number of packets that match certain criteria specified in the packet selection rules may be sent to the CPE detection engine. For example, the certain criteria may be that traffic from a particular port or to a particular port be sent to the CPE detection engine, that traffic to a certain device or from a certain device be sent to the CPE detection engine, that traffic to a device with a particular operating system or from a device with a particular operating system be sent to the CPE detection engine, and/or or that traffic with a particular type of payload be sent to the CPE detection engine. As various factors change such as CPE resource constraints, threat information, network utilization, traffic volume, time of day, geographic location, or any other relevant factors, the dynamic packet selection optimizer may update the packet selection rules in terms of how many packets of each communication session to send and which communication sessions' predefined number of packets to send to the CPE detection engine and which communication sessions' predefined number of packets to send to the cloud detection engine.

Having the CPE detection engine perform inspection is advantageous in that it may result in faster remediation than if the detection is performed on the cloud. However, the detection performed on the CPE has to be balanced with the resource constraints of the CPE. The pending application achieves this balance via the dynamic packet section optimizer monitoring factors and updating the packet selection rules as well as a dynamic detection rule optimizer on the computer system monitoring factors and updating CPE detection rules.

The CPE detection rules applied by the CPE detection engine may be a subset of the cloud detection rules applied by the cloud detection engine. The CPE detection rules applied by the CPE detection engine (e.g., which subset of the cloud detection rules to select for the CPE detection rules) may vary based at least in part on the resource constraints of the CPE. The dynamic detection rule optimizer on the computer system may monitor various factors and determine the CPE detection rules and/or updated CPE detection rules for the CPE detection engine based on monitoring such factors. These factors may include CPE load characteristics, internal threat information, external threat information, asset characteristics, traffic protocol types, time of day, or any other relevant factors. The CPE detection engine may apply various levels of detection depending on the CPE detection rules. For example, in some cases, the CPE detection engine may apply a first level of inspection based on the CPE detection rules. The first level of inspection may be less CPE resource intensive than other levels of inspection performed by the CPE detection engine. For instance, the first level of inspection may comprise a blacklist or a blocklist of Internet Protocol (IP) addresses and/or header inspection. In some cases, the CPE detection engine may apply a second level of inspection based on the CPE detection rules. The second level of inspection may be more CPE resource intensive than the first level of inspection. For instance, the second level of inspection may comprise an expanded blacklist or blocklist of IP addresses and/or User Datagram Protocol (UDP) inspection. In some cases, the CPE detection engine may apply a third level of inspection based on the CPE detection rules. The third level of inspection may be more CPE resource intensive than the second level of inspection. For instance, the third level of inspection may comprise a further expanded blacklist or blocklist of IP addresses, domain inspection, and/or payload inspection. Other levels of inspection or different levels of inspection may be performed by the CPE detection engine without departing from the spirit or scope of the disclosure.

Particular traffic may be blocked or quarantined on the CPE based on the inspection performed by the CPE detection engine. In some embodiments, all of the predefined number of packets inspected by the CPE detection engine may be sent to the cloud detection engine for further inspection. In other embodiments, some of the predefined number of packets inspected by the CPE detection engine may be sent to the cloud detection engine for further inspection or more packets than the predefined number of packets inspected by the CPE detection engine may be sent to the cloud detection engine for further inspection.

In addition to the dynamic packet selection optimizer and the dynamic detection rule optimizer, the computer system may comprise one or more load balancers to balance the load of the predefined number of packets to a plurality of virtual compute instances based on communication session for inspection by the cloud detection engine. The cloud detection engine inspects the predefined number of packets received from the packet selector based on cloud detection rules. For example, the cloud detection engine may perform header inspection, DNS packet inspection, TLS handshake inspection, payload inspection, or another type of packet inspection on the predefined number of packets. Based on the inspection, if the detection engine identifies a potential cyber threat, the computer system may initiate blocking of particular traffic. For instance, a governor may send a notification to a telecommunications carrier identifying particular traffic to be blocked, resulting in the telecommunications carrier blocking the particular traffic. Alternatively, if the cloud detection engine identifies a potential cyber threat, the cloud detection engine can instruct the CPE to block the particular traffic on the CPE.

In some cases, the predefined number of packets selected and sent by the packet selector to the CPE detection engine or the cloud detection engine may be a predefined initial number of packets. Based on the inspection of the predefined initial number of packets, the packet selector may, under instructions from the CPE detection engine or the cloud detection engine, select and send additional packets associated with one or more of the communication sessions to the CPE detection engine or the cloud detection engine to either collect more information/intel or to help support a decision to block or recommend blocking a particular communication.

Turning to FIG. 1, a dynamic hybrid threat detection system 100 is described. The dynamic hybrid threat detection system 100 may comprise a customer premises equipment (CPE) 102, one or more electronic devices 104, a computer system 106, a telecommunications carrier server 108, a database 110, and a network 112. The network 112 promotes communication between the components of the dynamic hybrid threat detection system 100. The network 112 may be any communication network including a public data network (PDN), a public switched telephone network (PSTN), a private network, and/or a combination.

The CPE 102 is telecommunications and information technology equipment kept at a customer's physical location rather than on the telecommunications carrier's premises. The CPE 102 may comprise a router, a firewall, a home gateway, an access point, and/or another component. Communication traffic to and from the electronic devices 104 may flow through the CPE 102. In some embodiments, east/west communication traffic between internal endpoints within a home network 114 may also flow through the CPE 102. The electronic devices 104 may comprise one or more of a mobile phone, a smart phone, a wearable computer, a headset computer, a laptop computer, a notebook computer, a tablet computer, an Internet of Things (IoT) device, or another device.

In an embodiment, the CPE 102 and the electronic devices 104 are located within a home network 114. The home network 114 may be located in a residential environment, such as in a home. The home network 114 may interconnect the CPE 102 and the electronic devices 104 to the Internet such as via the network 112. As discussed above, home networks, such as the home network 114, are more prone to cyber-attack because of the growing amount of devices in home networks and the increased, differentiated use of home networks, as well as an increase in cyber security threats and a lack of basic cyber security measures in home networks.

As part of the dynamic hybrid threat detection system 100, the CPE 102 may comprise a processor 116 and a non-transitory memory 118. The non-transitory memory 118 of the CPE 102 may comprise a packet selector 120, a CPE detection engine 122, packet selection rules 124, and CPE detection rules 126. Further, as part of the dynamic hybrid threat detection system 100, the computer system 106 may comprise a dynamic packet selection optimizer 128, a dynamic detection rule optimizer 130, a cloud detection engine 132, a governor 134, and load balancer(s) 136. These components may be stored in a non-transitory memory of the computer system 106 and executed by a processor of the computer system 106. The computer system 106 may also store cloud detection rules 138 in a non-transitory memory. Additional details regarding computer systems are discussed hereinafter with reference to FIG. 4. While illustrated separately in FIG. 1, in some embodiments, the dynamic packet selection optimizer 128 and the dynamic detection rule optimizer 130 may be a single optimizing component.

The packet selector 120 may select a predefined number of packets from each communication session to initially send to the CPE detection engine 122 based on the packet selection rules 124. The packet selection rules 124 define how many packets from each communication session to send to the CPE detection engine 122 and/or the cloud detection engine 132. In some embodiments, rather than send the predefined number of packets from all communication sessions to the CPE detection engine 122, the packet selection rules 124 may also define whether to send a communication sessions' predefined number of packets to the CPE detection engine 122 or the cloud detection engine 132. In such embodiments, the packet selector 120 may determine which communication sessions' predefined number of packets to send to the CPE detection engine 122 versus which communication sessions' predefined number of packets to send to the cloud detection engine 132 based on the packet selection rules 124.

In an embodiment, the packet selection rules 124 may be default packet selection rules. Based on the default set of rules, the packet selector 120 may select and send a default number such as 5 packets, 10 packets, 15 packets, or some other number of packets. The default number may depend on the type of communication protocol for a given communication session. Thus, the default number of predefined number of packets for one communication session may be a different number of packets than the predefined number of packets for another communication session. In some cases, the default number may be the first 5 packets in a communication session, the first 10 packets in a communication session, the first 15 packets in a communication session, or some other number of packets potentially located in a place other than the beginning of a communication session.

In some embodiments, the packet selector 120 sends all of the packets from one or more communication sessions to the CPE detection engine 122 or the cloud detection engine 132. In such embodiments, in some cases, the packet selector 120 may shift to sending a predefined number of packets less than the total number of packets based on one or more factor(s) monitored by the dynamic packet selection optimizer 128. The packet selector 120 may apply different rules specifying different predefined numbers of packets depending on various characteristics of a given communication session. The packet selection rules 124 may be dynamically updated based on one or more factor(s) monitored by the dynamic packet selection optimizer 128.

The predefined number of packets initially selected and sent by the packet selector 120 to the CPE detection engine 122 and/or the cloud detection engine 132 may vary depending on one or more characteristics of a particular communication session based on the packet selection rules 124. For instance, the predefined number of packets at least initially selected and sent by the packet selector 120 to the CPE detection engine 122 and/or the cloud detection engine 132 may vary depending on the type of protocol used in the communication session (e.g., encrypted protocol type, an unencrypted protocol type, a stateful session protocol type, a stateless session protocol type, etc.). In one non-limiting example, if a particular communication session is encrypted, the packet selection rules 124 may indicate for the packet selector 120 to select the unencrypted packets at the beginning of the communication session. For a Transport Layer Security (TLS) handshake, the number of unencrypted packets at the beginning of an encrypted communication session may be 4. However, that number may be more or less depending on the protocol. For an encrypted communication session, selecting and sending any encrypted packets following the unencrypted packets to the CPE detection engine 122 and/or the cloud detection engine 132 would be a waste of resources because of the encryption. In another non-limiting example, if a particular communication session uses a stateless session protocol type, the packet selection rules 124 may indicate that the packet selector 120 is to send all of the communication packets for the particular communication session. The stateless session protocol type may be User Datagram Protocol (UDP), which may include Domain Name System (DNS) queries, or other stateless communications.

Another factor that may affect the predefined number of packets at least initially selected and sent by the packet selector 120 to the CPE detection engine 122 and/or the cloud detection engine 132 based on the packet selection rules 124 is asset characteristics. Asset characteristics consider asset value and asset risk for a given endpoint and may comprise one or more of an internal endpoint for a communication session, an operating system type of an internal endpoint, an external endpoint for a communication session, or another characteristic of the asset. Thus, the number of packets at least initially selected and sent by the packet selector 120 to the CPE detection engine 122 and/or the cloud detection engine 132 may vary depending on an internal endpoint for a communication session, an operating system type of an internal endpoint, and/or an external endpoint for a communication session. In one non-limiting example, the packet selection rules 124 may specify that more packets from a first type of internal endpoint or external endpoint are to be selected and sent to the CPE detection engine 122 and/or the cloud detection engine 132 than from a second type of internal endpoint or external endpoint. For instance, the packet selection rules 124 may specify a greater number of predefined packets are to be selected and sent by the packet selector 120 to the CPE detection engine 122 and/or the cloud detection engine 132 for communication sessions that have an internal endpoint that is a laptop, PC, phone, or another device that is used for email and may be more prone to phishing attacks than, for example, a communication session that has an internal endpoint not used for emails such as an IoT device.

In another non-limiting example, the packet selection rules 124 may specify that a lesser number of predefined packets are to be selected and sent by the packet selector 120 to the CPE detection engine 122 and/or the cloud detection engine 132 for communication sessions that have an internal endpoint that is of lower risk in terms of processing power, what the internal endpoint is connected to, and/or what is stored on the internal endpoint. In contrast, the packet selection rules 124 may specify that a greater number of predefined packets are to be selected and sent by the packet selector 120 to the CPE detection engine 122 and/or the cloud detection engine 132 for communication sessions that have an internal endpoint that is higher risk in terms of more processing power, being connected to other devices/appliances that may cause more harm, and/or having more important data (e.g., financial records, etc.) stored thereon. For example, the packet selection rules 124 may specify that a greater number of predefined packets are to be selected and sent by the packet selector 120 to the CPE detection engine 122 and/or the cloud detection engine 132 for communication sessions with a family computer in the home network 114 as an internal endpoint since it likely has more processing power and confidential information stored thereon.

Endpoints may comprise servers, laptops, desktops, set top boxes, wireless access points, routers, handsets, appliances, other network systems, new/transient devices, IoT devices, or other devices. As discussed above, the predefined number of packets at least initially selected and sent by the packet selector 120 to the CPE detection engine 122 and/or the cloud detection engine 132 may vary depending on an operating system type of an internal endpoint. In yet another non-limiting example, the packet selection rules 124 may indicate that a larger number of packets for communication sessions with an internal endpoint having a particular operating system (e.g., ANDROID, iOS, etc.) are to be selected and sent by the packet selector 120 to the CPE detection engine 122 and/or the cloud detection engine 132. In one additional non-limiting example, the packet selection rules 124 may indicate that a greater number of packets for communication sessions with an internal endpoint of a new/transient device within the home network 114 are to be selected and sent by the packet selector 120 to the CPE detection engine 122 and/or the cloud detection engine 132 than for communication sessions with internal endpoints of previously established devices within the home network 114.

Another factor that may affect the number of packets at least initially selected and sent by the packet selector 120 to the CPE detection engine 122 and/or the cloud detection engine 132 based on the packet selection rules 124 is threat information. The threat information may comprise internal threat information or external threat information. Internal threats may involve odd and/or concerning activity occurring within the home network 114 while external threats may involve odd and/or concerning activity occurring outside the home network 114. External threats may be based on time of day, geographic location, or other factors. The internal and/or external threat information may be stored in database 110 and sent to the dynamic packet selection optimizer 128 for use when creating the packet selection rules 124. In order to avoid disruption of the traffic, the packet selector 120 may send duplicate packets to the CPE detection engine 122 and/or the cloud detection engine 132.

In an embodiment, the packet selector 120 compares each communication session to an allowlist. In an embodiment, the allowlist is a whitelist. If the communication is a known, safe communication (i.e., found on the allowlist), the packet selector 120 may not send any of the packets of the corresponding communication session to the CPE detection engine 122 and/or the cloud detection engine 132. However, if the communication is not on the allowlist, the packet selector 120 may apply the packet selection rules 124 and select and send a predefined number of packets to the CPE detection engine 122 and/or the cloud detection engine 132.

In an embodiment, the packet selector 120 selects and sends the predefined number of packets for all of the communication sessions to the CPE detection engine 122 first. In such an embodiment, in response to the inspection performed by the CPE detection engine 122, the packet selector 120 may send the predefined number of packets of at least some of the communication sessions to the cloud detection engine 132. For example, the predefined number of packets of any of the communication sessions that do not raise a threat indication based on the inspection performed by the CPE detection engine 122 may be sent to the cloud detection engine 132 for further inspection. In some cases, even the predetermined number of packets of communication sessions that raise a threat indication based on the inspection performed by the CPE detection engine 122 may be sent to the cloud detection engine 132.

While discussed above as having the predetermined number of packets for all communication sessions sent to the CPE detection engine 122 initially and then having at least some of those sent on to the cloud detection engine 132, in some embodiments, the packet selection rules 124 may specify which communication session's predefined number of packets are to be sent to the CPE detection engine 122 versus which communication session's predefined number of packets are sent to the cloud detection engine 132. Stated differently, in some embodiments, there may be certain communication session's predefined number of packets that bypass the CPE detection engine 122 and go straight to the cloud detection engine 132 based on the packet selection rules 124 applied by the packet selector 120. In such embodiments, the packet selection rules 124 may also define which communication session's predefined number of packets are sent to the CPE detection engine 122 and which communication session's predefined number of packets are sent to the cloud detection engine 132.

Communication sessions that match certain criteria defined by the packet selection rules 124 may have their predefined number of packets sent to the CPE detection engine 122 for inspection. Other communication sessions that do not match that certain criteria defined by the packet selection rules 124 or match different characteristics defined by the packet selection rules 124 may have their predefined number of packets sent to the cloud detection engine 132 for inspection. Which communication session's predefined number of packets are sent to the CPE detection engine 122 versus which communication session's predefined number of packets are sent to the cloud detection engine 132 may dynamically change over time via updates to the packet selection rules 124 by the dynamic packet selection optimizer 128 based on monitoring various internal and/or external factors such as CPE load characteristics, internal threat information, external threat information, asset characteristics, traffic protocol types, or other factors.

In one non-limiting example, the decision of whether to send a communication session's packets to the CPE detection engine 122 or the cloud detection engine 132 may depend on a source or a destination (e.g., a particular port, a particular device, an operating system of the source or destination, etc.) of the communication session. In another non-limiting example, the decision of whether to send a communication session's packets to the CPE detection engine 122 or the cloud detection engine 132 may depend on a type of payload. For instance, in the world of HTTP requests, smaller payloads such as a POST may be sent to the CPE detection engine 122 while larger payloads such as a GET may be sent to the cloud detection engine 132.

In yet another non-limiting example, more communication sessions' predefined numbers of packets may be sent to the CPE detection engine 122 when there are less resource constraints (e.g., memory and/or processor constraints) on the CPE 102. For instance, during certain days of the week or certain hours of a day, there may be less resource constraints on the CPE 102, and therefore more communication sessions' predefined numbers of packets may be sent to the CPE detection engine 122 for inspection. In yet another non-limiting example, the packet selection rules 124 may define that communication sessions for certain devices or certain operating systems be sent to the CPE detection engine 122 based on threat information. As various factors change such as CPE resource constraints, threat information, network utilization, traffic volume, time of day, geographic location, or any other relevant factors, the dynamic packet selection optimizer 128 may update the packet selection rules 124 in terms of how many packets of each communication session to send and which communication session's predefined number of packets to send to the CPE detection engine 122 and which communication session's predefined number of packets to send to the cloud detection engine 132.

Having the CPE detection engine 122 perform inspection is advantageous in that it may result in faster remediation than if the detection is performed on the cloud. However, the detection performed on the CPE 102 has to be balanced with the resource constraints of the CPE 102. This balance is achieved via the dynamic packet section optimizer 128 monitoring factors and updating the packet selection rules 124 and the dynamic detection rule optimizer 130 monitoring factors and updating CPE detection rules 126.

The CPE detection rules 126 applied by the CPE detection engine 122 may be a subset of the cloud detection rules 138 applied by the cloud detection engine 132. The CPE detection rules 126 applied by the CPE detection engine 122 (e.g., which subset of the cloud detection rules 138 to select for the CPE detection rules 126) may vary based at least in part on the resource constraints of the CPE. The dynamic detection rule optimizer 130 may monitor various factors and determine the CPE detection rules 126 and/or updated CPE detection rules for the CPE detection engine 122 based on the monitored factor(s). These factors may include CPE load characteristics, internal threat information, external threat information, asset characteristics, traffic protocol types, time of day, or any other relevant factors. The CPE detection engine 122 may apply various levels of detection depending on the CPE detection rules 126. Such levels of detection may include one or more of the following a blacklist or blocklist of IP addresses, UDP inspection, other domain inspection (e.g., Domain Name Service (DNS) resolution), Transmission Control Protocol (TCP) header inspection, TCP payload inspection, and/or other types of inspection.

In some cases, the CPE detection engine 122 may apply a first level of inspection based on the CPE detection rules 126. The first level of inspection may be less CPE resource intensive than other levels of inspection performed by the CPE detection engine 122. For instance, the first level of inspection may comprise a blacklist or blocklist of Internet Protocol (IP) addresses and/or header inspection. The first level of inspection may not comprise any payload inspection. In some cases, the CPE detection engine 122 may apply a second level of inspection based on the CPE detection rules 126. The second level of inspection may be more CPE resource intensive than the first level of inspection. For instance, the second level of inspection may comprise an expanded blacklist or blocklist of IP addresses and/or UDP inspection. In some cases, the CPE detection engine 122 may apply a third level of inspection based on the CPE detection rules 126. The third level of inspection may be more CPE resource intensive than the second level of inspection. For instance, the third level of inspection may comprise a further expanded blacklist or blocklist of IP addresses, domain inspection, and/or payload inspection. Other levels of inspection or different levels of inspection may be performed by the CPE detection engine without departing from the spirit or scope of the disclosure.

The inspection performed by the CPE detection engine 122 based on the CPE detection rules 126 may comprise string or pattern matching. The CPE detection rules 126 may be applied to a single communication session. In some embodiments, the CPE detection rules 126 may be applied to a group of communication sessions. In such embodiments, earlier communication sessions of the group would need to be cached on the CPE 102.

Behavioral analytics for example using machine learning may be performed by the computer system 106, and the results of such behavioral analytics may be used to determine what CPE detection rules 126 are delivered to the CPE 102. For example, a machine learning model may be used by the dynamic detection rule optimizer 130 to determine what CPE detection rules 126 to deliver to the CPE 102. The behavioral analytics may also be used by the dynamic packet selection optimizer 128 to create the packet selection rules 124.

The cloud detection engine 132 may receive and inspect the predefined numbers of packets received from the packet selector 120 based on the cloud detection rules 138. The load balancer(s) 136 within the computer system 106 may balance the load of the predefined number of packets to a plurality of virtual compute instances based on communication session for inspection by the cloud detection engine 132.

In an embodiment, the cloud detection engine 132 performs additional packet inspection on the received packets. In an embodiment, cloud detection engine 132 performs one or more of header inspection, DNS packet inspection, TLS handshake inspection, or deep packet inspection on the received packets based on the cloud detection rules 138. As mentioned above, packet inspection requires extensive resources and impacts overall network performance. By having the packet inspection performed on a pre-defined number of packets and split between the CPE detection engine 122 and the cloud detection engine 132, the CPE 102 and the network 112 do not experience the typical extensive resource and performance issues caused by traditional packet inspection.

The dynamic packet selection optimizer 128 may monitor one or more factors including internal threat information, external threat information, asset characteristics, traffic protocol types, CPE load characteristics, or other factors. The CPE load characteristics may include processor load on a processor of the CPE 102, memory load on a memory of the CPE 102, load on bandwidth, and/or connections per second. The CPE load characteristics may indicate an overall health of the CPE 102, which may in turn indicate an issue with or a security vulnerability of the CPE 102. The other factors including internal threat information, external threat information, asset characteristics, and traffic protocol types have been discussed in more detail above. The packet selection rules 124 created by the dynamic packet selection optimizer 128 may be based on monitoring the one or more factors.

The dynamic detection rule optimizer 130 may also monitor one or more factors including internal threat information, external threat information, asset characteristics, traffic protocol types, CPE load characteristics, or other factors. The CPE detection rules 126 created by the dynamic detection rule optimizer 130 may be based on monitoring the one or more factors. While the functionality of the dynamic packet selection optimizer 128 and the dynamic detection rule optimizer 130 are discussed as being performed separately by different components herein, the functionality of both the dynamic packet selection optimizer 128 and the dynamic detection rule optimizer 130 could be combined into a single component without departing from the spirit or scope of the present disclosure.

The dynamic packet selection optimizer 128 may continue to monitor the one or more factors, create updated packet selection rules, and send the updated packet selection rules to the packet selector 120. The updated packet selection rules may increase or decrease the number of packets from particular communication sessions selected and sent by the packet selector 120 to the CPE detection engine 122 and/or the cloud detection engine 132. The updated packet selection rules may also change which communication session(s) are sent to the CPE detection engine 122 versus the cloud detection engine 132.

In an embodiment, rather than the dynamic packet selection optimizer 128 being stored on the computer system 106, there may be a CPE dynamic packet selection optimizer 140 stored on the CPE 102. In such an embodiment, the CPE dynamic packet selection optimizer 140 may perform the functions described above with regard to the dynamic packet selection optimizer 128. Alternatively, the dynamic packet selection optimizer 128 stored on the computer system 106 and the CPE dynamic packet selection optimizer 140 stored on the CPE 102 may both be present and they may share the functionality of monitoring factors and determining the packet selection rules 124.

The dynamic detection rule optimizer 130 may continue to monitor the one or more factors, determine updated CPE detection rules, and send the updated CPE detection rules to the CPE detection engine 122. The updated CPE detection rules may change the level of detection performed by the CPE detection engine 122. The updated CPE detection rules may comprise a different subset of the cloud detection rules 138.

Based on the outcome of the inspection performed by the CPE detection engine 122, a number of actions may take place. For example, particular traffic may be blocked or quarantined on the CPE 102 based on the inspection performed by the CPE detection engine 122. Some of the predefined number of packets for one or more communication sessions inspected by the CPE detection engine 122 may be sent to the cloud detection engine 132 for further inspection using the cloud detection rules 138. For example, additional inspection (e.g., looking into the payload, etc.) may be performed by the cloud detection engine 132 using the cloud detection rules 138 than was performed by the CPE detection engine 122. In some embodiments, depending on the outcome of the inspection performed by the CPE detection engine 122, different packet selection rules 124 may be sent to the CPE 102 for the packet selector 120 to use and/or different CPE detection rules 126 may be sent to the CPE 102 for the CPE detection engine 122 to use.

Based on the outcome of the inspection performed by the cloud detection engine 132, a number of actions may take place. For example, a telecommunications carrier may be notified of the threat. In an embodiment, the governor 134 notifies the telecommunications carrier such as via the telecommunications carrier server 108 to block particular communication traffic. In response to receiving the notification, the telecommunications carrier may block the particular communication traffic. Alternatively, the particular traffic may be blocked on the CPE 102 itself. For example, the cloud detection engine 132 may instruct the CPE 102 to block the particular traffic on the CPE 102.

In some cases, after inspecting the predefined number of packets but before blocking the particular communication traffic or notifying the telecommunications carrier, the CPE detection engine 122 and/or the cloud detection engine 132 may receive and inspect additional packets pertaining to the communication session(s) from the packet selector 120. Based on the inspecting of the additional packets, the governor 134 may determine whether or not to notify the telecommunications carrier and/or initiate the blocking of certain communication traffic, the cloud detection engine 132 may determine whether to instruct the CPE 102 to block certain communication traffic on the CPE 102, or the CPE detection engine 122 may determine whether or not to block or quarantine the particular communication traffic. In other cases, in order to gather more information/intel, after inspecting the predefined number of packets, the CPE detection engine 122 and/or the cloud detection engine 132 may receive and inspect additional packets pertaining to one or more of the communication sessions from the packet selector 120 after the governor 134 notifies the telecommunications carrier and/or initiates blocking the particular communication traffic, the cloud detection engine 132 instructs the CPE 102 to block the particular communication traffic, or the CPE detection engine 122 blocks or quarantines the particular communication traffic.

Figure 2A:
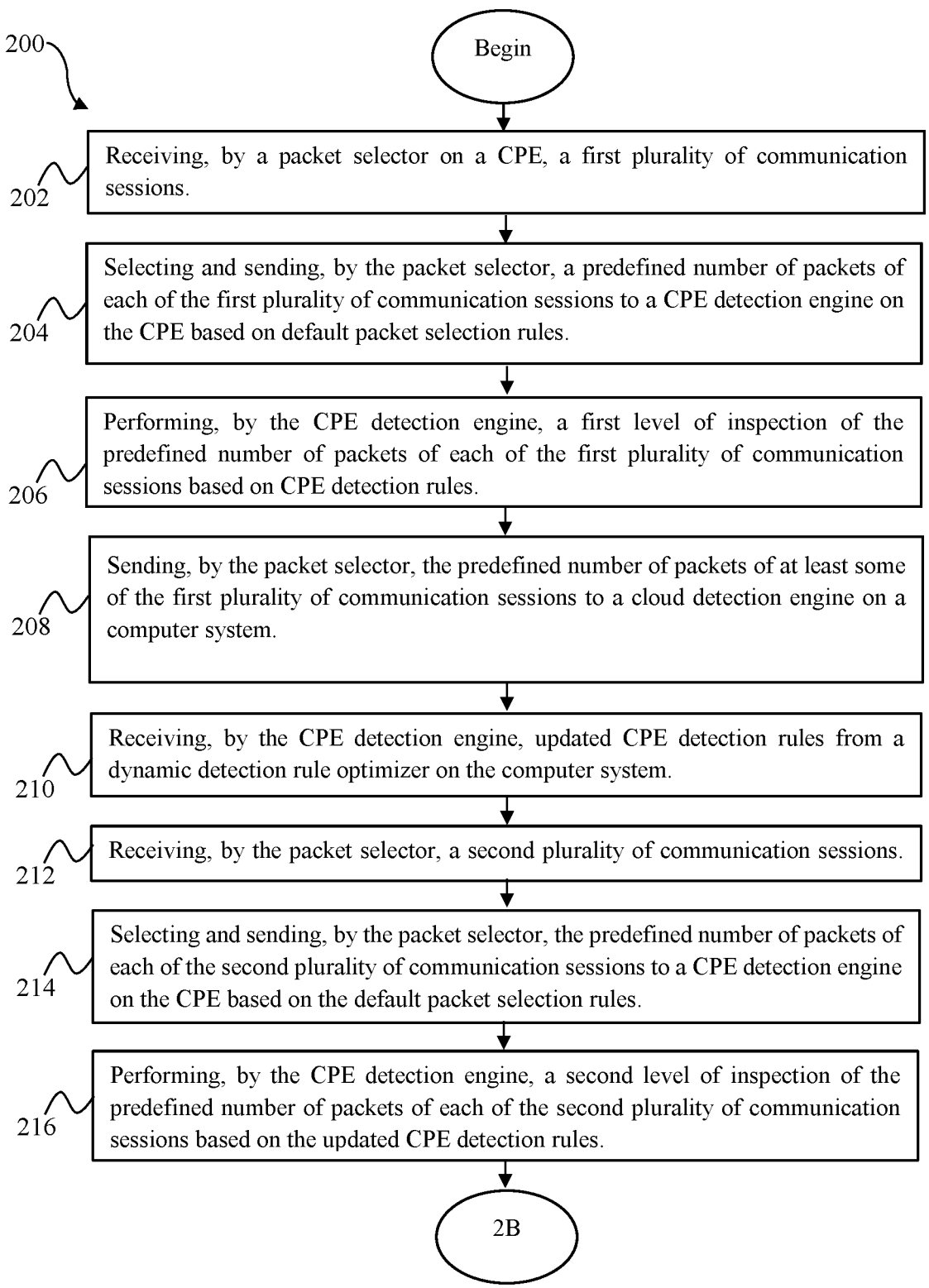
FIGS. 2A and 2B are a flow chart of a dynamic hybrid threat detection method according to an embodiment of the disclosure.
Figure 2B:
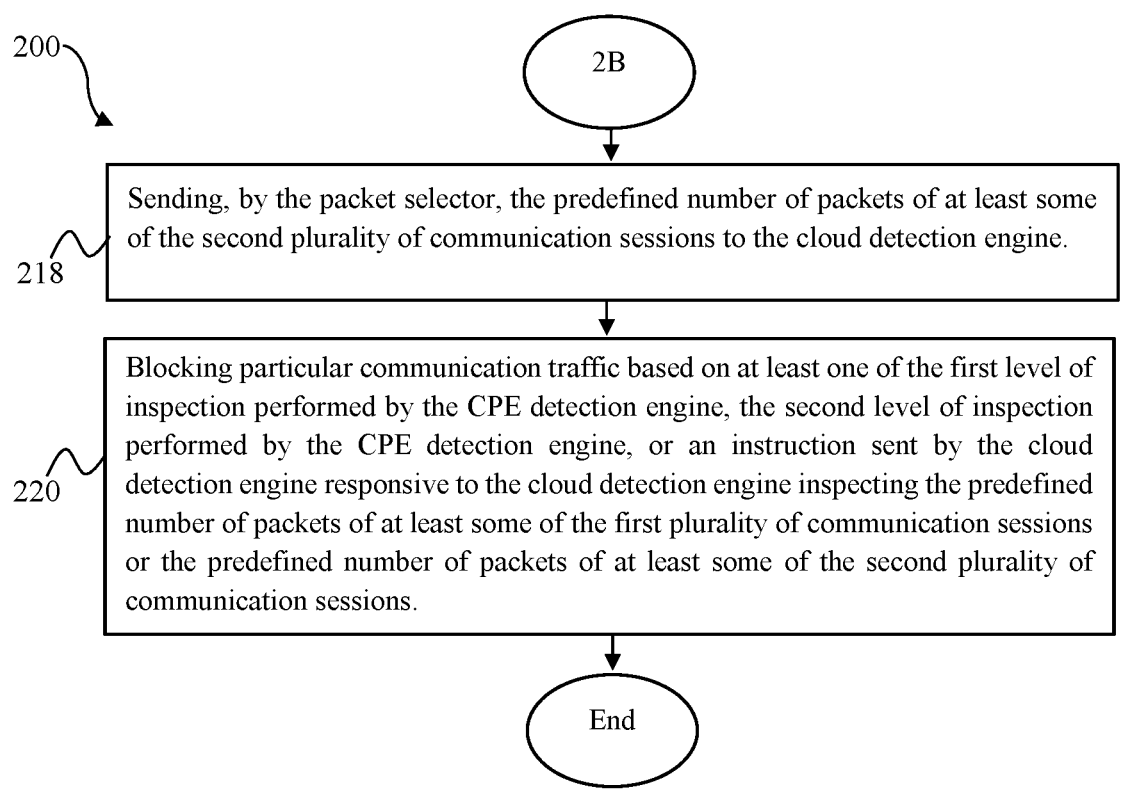

Turning now to FIGS. 2A and 2B, a dynamic hybrid threat detection method 200 is described. At block 202, a packet selector (e.g., packet selector 120) on a CPE (e.g., CPE 102) receives a first plurality of communication sessions. At block 204, the packet selector selects and sends a predefined number of packets of each of the first plurality of communication sessions to a CPE detection engine (e.g., CPE detection engine 122) on the CPE based on default packet selection rules (e.g., packet selection rules 124). At block 206, the CPE detection engine performs a first level of inspection of the predefined number of packets of each of the first plurality communication sessions based on CPE detection rules (e.g., CPE detection rules 126). At block 208, the packet selector sends the predefined number of packets of at least some of the first plurality of communication sessions to a cloud detection engine (e.g., cloud detection engine 132) on a computer system (e.g., computer system 106).

At block 210, the CPE detection engine receives updated CPE detection rules from a dynamic detection rule optimizer on the computer system. At block 212, the packet selector receives a second plurality of communication sessions. At block 214, the packet selector selects and sends the predefined number of packets of each of the second plurality of communication sessions to the CPE detection engine based on the default packet selection rules. At block 216, the CPE detection engine performs a second level of inspection on the predefined number of packets of each of the second plurality of communication sessions based on the updated CPE detection rules. At block 218, the packet selector sends the predefined number of packets of at least some of the second plurality of communication sessions to the cloud detection engine. At block 220, a step of initiating blocking of particular communication traffic occurs based on at least one of the first level of inspection performed by the CPE detection engine, the second level of inspection performed by the CPE detection engine, or an instruction sent by the cloud detection engine responsive to the cloud detection engine inspecting the predefined number of packets of at least some of the first plurality of communication sessions or the predefined number of packets of at least some of the second plurality of communication sessions.

Figure 3:
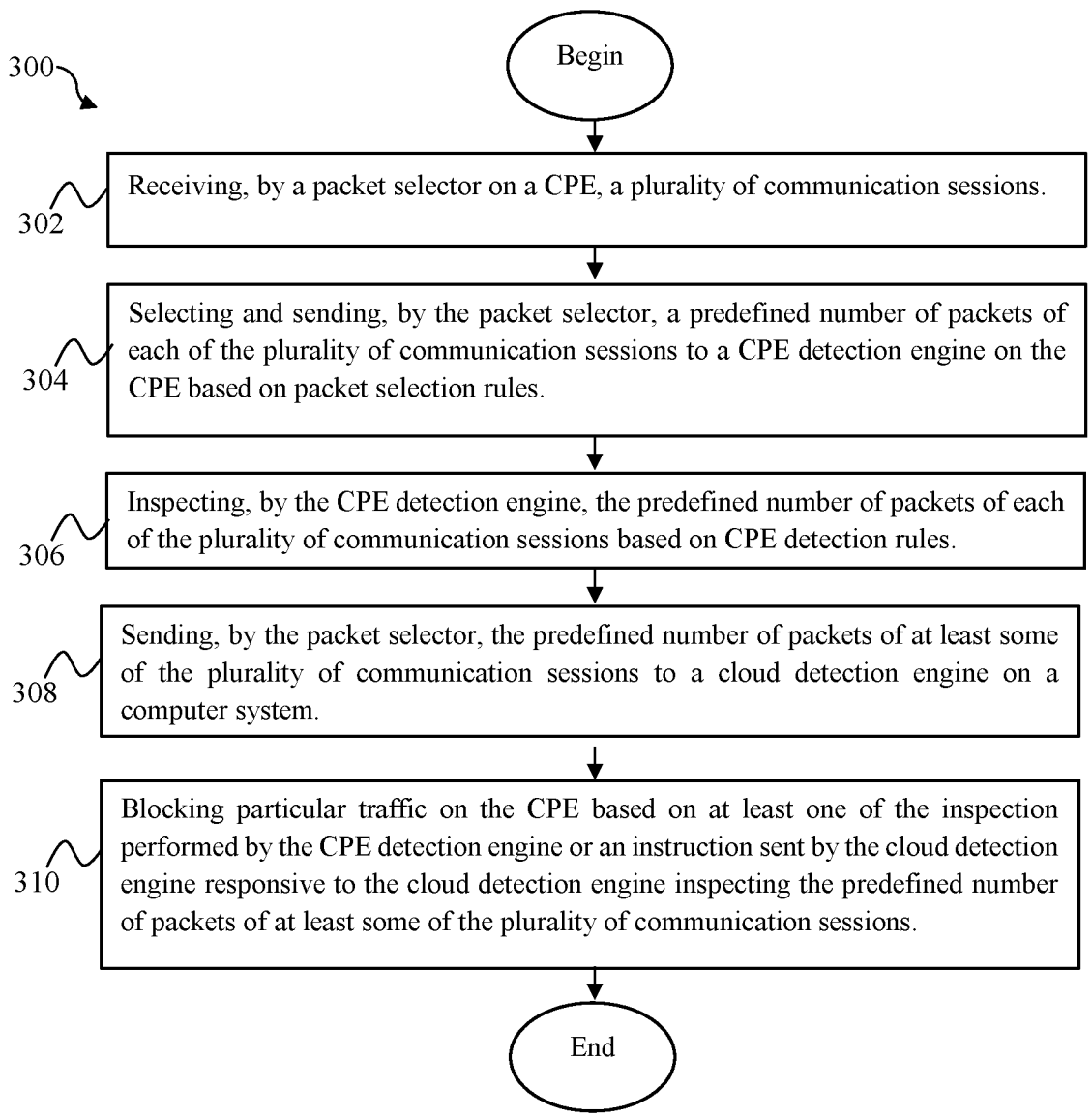
FIG. 3 is a flow chart of a dynamic hybrid threat detection method according to an embodiment of the disclosure.

Turning now to FIG. 3, a dynamic hybrid threat detection method 300 is described. At block 302, a packet selector (e.g., packet selector 120) on a CPE (e.g., CPE 102) receives a plurality of communication sessions. At block 304, the packet selector selects and sends a predefined number of packets of each of the plurality of communication sessions to a CPE detection engine (e.g., CPE detection engine 122) on the CPE based on packet selection rules (e.g., packet selection rules 124). At block 306, the CPE detection engine inspects the predefined number of packets of each of the plurality of communication sessions based on CPE detection rules (e.g., CPE detection rules 126). At block 308, the packet selector sends the predefined number of packets of at least some of the plurality of communication sessions to a cloud detection engine (e.g., cloud detection engine 132) on a computer system. At block 310, a step of blocking particular traffic on the CPE occurs based on based on at least one of the inspection performed by the CPE detection engine or an instruction sent by the cloud detection engine responsive to the cloud detection engine inspecting the predefined number of packets of at least some of the plurality of communication sessions. For example, the cloud detection engine may instruct the CPE to block particular traffic based on further inspection performed by the cloud detection engine on the at least some of the plurality of communication sessions.

Figure 4:
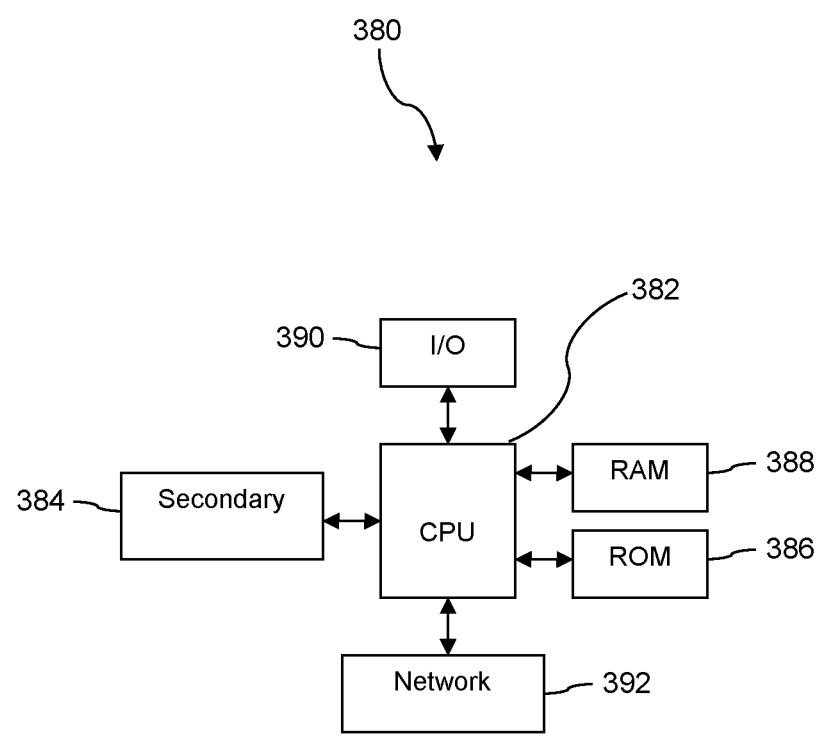
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the context of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A dynamic hybrid residential threat detection system comprising:
   a customer premises equipment (CPE) comprising:
   a non-transitory memory;
   a processor;
   a packet selector stored in the non-transitory memory of the CPE, that when executed by the processor of the CPE:
   receives a plurality of communication sessions,
   selects and sends a predefined number of packets of each of the plurality of communication sessions to a CPE detection engine on the CPE based on packet selection rules, and
   the CPE detection engine stored in the non-transitory memory of the CPE, that when executed by the processor of the CPE:
   inspects the predefined number of packets of each of the plurality of communication sessions based on CPE detection rules, wherein the CPE detection rules establish what type of inspection is to be performed by the CPE detection engine based at least in part on resource constraints of the CPE, wherein different levels of inspection are performed by the CPE detection engine based at least in part on the resource constraints of the CPE including a first level of inspection when the resource constraints of the CPE are above a resource constraint threshold and a second level of inspection when the resource constraints of the CPE are below the resource constraint threshold, and wherein the first level of inspection is less CPE resource intensive than the second level of inspection, and
   in response to the inspection, sends the predefined number of packets of at least some of the plurality of communication sessions to a cloud detection engine; and
   a computer system comprising:
   a non-transitory memory;
   a processor;
   a dynamic detection rule optimizer stored in the non-transitory memory of the computer system that, when executed by the processor of the computer system, selects and sends the CPE detection rules to the CPE detection engine, wherein the CPE detection rules are a subset of cloud detection rules; and the cloud detection engine stored in the non-transitory memory of the computer system that, when executed by the processor of the computer system, receives and inspects the predefined number of packets of each of the at least some of the plurality of communication sessions based on the cloud detection rules, wherein particular communication traffic is blocked based on at least one of the inspection performed by the CPE detection engine or the inspection performed by the cloud detection engine.

2. The system of claim 1, further comprising a dynamic packet selection optimizer stored and executed by the CPE or the computer system, wherein the dynamic packet selection optimizer is configured to:
monitor at least one factor including at least one of internal threat information, external threat information, asset characteristics, traffic protocol types, or CPE load characteristics, and
creates the packet selection rules based on monitoring the at least one factor.

3. The system of claim 1, wherein the dynamic detection rule optimizer is further configured to determine which rules of the cloud detection rules are included in the CPE detection rules based on monitoring one or more factors including one or more of internal threat information, external threat information, asset characteristics, traffic protocol types, or CPE load characteristics.

4. The system of claim 1, wherein the packet selector is further configured to:
compare each communication session to an allowlist, and
send only the predefined number of packets for each communication session not on the allowlist to the CPE detection engine.

5. The system of claim 1, wherein the particular communication traffic is blocked by the CPE based on an instruction sent by the cloud detection engine in response to the cloud detection engine inspecting the predefined number of packets of each of the at least some of the plurality of communication sessions.

6. A dynamic hybrid residential threat detection method comprising:
receiving, by a packet selector stored in non-transitory memory of a customer premises equipment (CPE) and executable by a processor of the CPE, a first plurality of communication sessions;
selecting and sending, by the packet selector, a predefined number of packets of each of the first plurality of communication sessions to a CPE detection engine on the CPE based on default packet selection rules;
responsive to resource constraints of the CPE being above a resource constraint threshold, performing, by the CPE detection engine, a first level of inspection on the predefined number of packets of each of the first plurality of communication sessions based on CPE detection rules;
sending, by the packet selector, the predefined number of packets of at least some of the first plurality of communication sessions to a cloud detection engine on a computer system;
receiving, by the CPE detection engine, updated CPE detection rules from a dynamic detection rule optimizer on the computer system;
receiving, by the packet selector, a second plurality of communication sessions;
selecting and sending, by the packet selector, the predefined number of packets of each of the second plurality of communication sessions to the CPE detection engine based on the default packet selection rules;
responsive to the resource constraints of the CPE being below the resource constraint threshold, performing, by the CPE detection engine, a second level of inspection on the predefined number of packets of each of the second plurality of communication sessions based on the updated CPE detection rules, wherein the first level of inspection is less CPE resource intensive than the second level of inspection;
sending, by the packet selector, the predefined number of packets of at least some of the second plurality of communication sessions to the cloud detection engine; and
blocking particular communication traffic based on at least one of the first level of inspection performed by the CPE detection engine, the second level of inspection performed by the CPE detection engine, or an instruction sent by the cloud detection engine responsive to the cloud detection engine inspecting the predefined number of packets of at least some of the first plurality of communication sessions or the predefined number of packets of at least some of the second plurality of communication sessions.

7. The method of claim 6, further comprising:
monitoring, by the dynamic detection rule optimizer, one or more factors including at least one of internal threat information, external threat information, asset characteristics, traffic protocol types, or CPE load characteristics;
determining, by the dynamic detection rule optimizer, the updated CPE detection rules based on monitoring the one or more factors.

8. The method of claim 7, wherein the CPE detection rules and the updated CPE detection rules are different subsets of cloud detection rules applied by the cloud detection engine.

9. The method of claim 6, wherein the first level of inspection comprises one or more of a blacklist of Internet Protocol (IP) addresses, header inspection, or User Datagram Protocol (UDP) inspection, and wherein the second level of inspection comprises one or more of an expanded blacklist of IP addresses, domain inspection, or deep packet inspection.

10. The method of claim 6, wherein the predefined number of packets of any of the first plurality of communication sessions that do not raise a threat indication based on application of the CPE detection rules are sent to the cloud detection engine for further inspection based on cloud detection rules.

11. The method of claim 6, further comprising inspecting, by the cloud detection engine, the predefined number of packets of each of the at least some of the first plurality of communication sessions by performing one or more of header inspection, DNS packet inspection, TLS handshake inspection, or deep packet inspection on the predefined number of packets.

12. The method of claim 11, further comprising notifying a telecommunications carrier to block particular communication traffic based on the inspecting performed by the cloud detection engine.

13. The method of claim 6, wherein the predefined number of packets for a first communication session of the first plurality of communication sessions is a different number of packets than the predefined number of packets for a second communication session of the first plurality of communication sessions.

14. A dynamic hybrid residential threat detection method comprising:
  receiving, by a packet selector stored in non-transitory memory of a customer premises equipment (CPE) and executable by a processor of the CPE, a plurality of communication sessions;
  selecting and sending, by the packet selector, a predefined number of packets of each of the plurality of communication sessions to a CPE detection engine on the CPE based on packet selection rules;
  inspecting, by the CPE detection engine, the predefined number of packets of each of the plurality of communication sessions based on CPE detection rules, wherein the CPE detection rules establish what type of inspection is to be performed by the CPE detection engine based at least in part on resource constraints of the CPE, wherein different levels of inspection are performed by the CPE detection engine based at least in part on the resource constraints of the CPE including a first level of inspection when the resource constraints of the CPE are above a resource constraint threshold and a second level of inspection when the resource constraints of the CPE are below the resource constraint threshold, and wherein the first level of inspection is less CPE resource intensive than the second level of inspection;
  sending, by the CPE detection engine, the predefined number of packets of at least some of the plurality of communication sessions to a cloud detection engine on a computer system; and
  blocking particular communication traffic on the CPE based on at least one of the inspection performed by the CPE detection engine or an instruction sent by the cloud detection engine responsive to the cloud detection engine inspecting the predefined number of packets of at least some of the plurality of communication sessions.

15. The method of claim 14, further comprising:
  receiving, by the packet selector from a dynamic packet selection optimizer on the computer system, updated packet selection rules, wherein the updated packet selection rules are determined by the dynamic packet selection optimizer based on monitoring one or more factors including one or more of internal threat information, external threat information, asset characteristics, traffic protocol types, or CPE load characteristics;
  receiving, by the packet, a second plurality of communication sessions;
  selecting and sending, by the packet selector, a different predefined number of packets of each of the second plurality of communication sessions to the CPE detection engine based on updated packet selection rules;
  inspecting, by the CPE detection engine, the different predefined number of packets of each of the second plurality of communication sessions based on the CPE detection rules; and
  sending, by the CPE detection engine, the different predefined number of packets of at least some of the second plurality of communication sessions to the cloud detection engine.

16. The method of claim 14, wherein the CPE detection rules are a subset of cloud detection rules applied by the cloud detection engine, and wherein a dynamic detection rule optimizer on the computer system determines which rules of the cloud detection rules are included in the CPE detection rules based on monitoring one or more factors including one or more of internal threat information, external threat information, asset characteristics, traffic protocol types, or CPE load characteristics.

17. The method of claim 15, wherein the predefined number of packets of any of the plurality of communication sessions that do not raise a threat indication based on application of the CPE detection rules are sent to the cloud detection engine for further inspection based on the cloud detection rules.

18. The method of claim 14, wherein the predefined number of packets for a first communication session of the plurality of communication sessions is a different number of packets than the predefined number of packets for a second communication session of the plurality of communication sessions.

* * * * *